Patented July 15, 1930

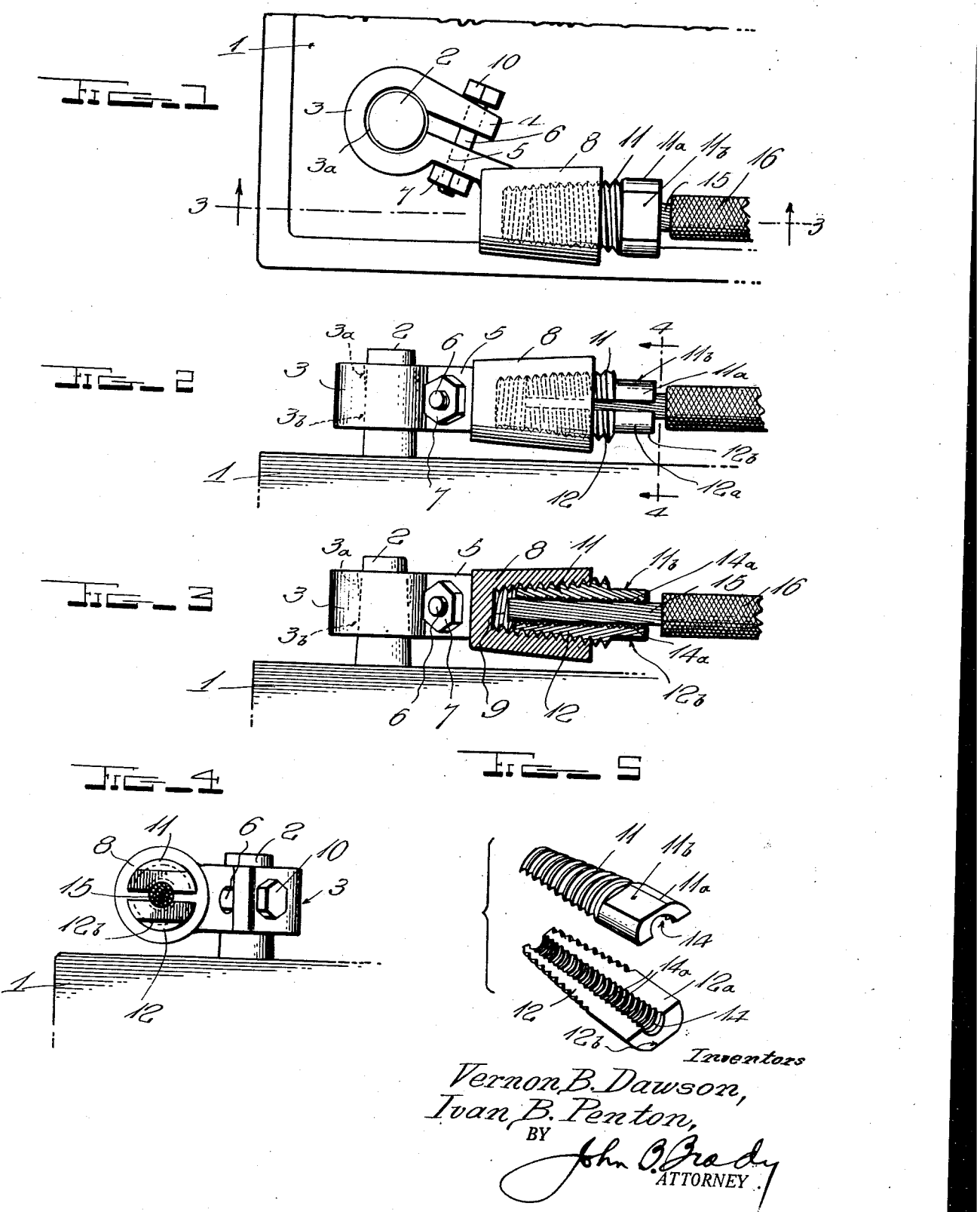

1,770,748

UNITED STATES PATENT OFFICE

VERNON B. DAWSON AND IVAN B. PENTON, OF WILMINGTON, DELAWARE

SOLDERLESS BATTERY TERMINAL

Application filed December 31, 1926. Serial No. 158,249.

Our invention relates broadly to storage battery terminals and more particularly to a solderless terminal for establishing a connection between a cable and the terminal of a storage battery.

One of the objects of our invention is to provide a simplified construction of storage battery terminal by which connection may be made between the battery and a cable without the necessity of applying solder about the junction point of the cable with the terminal.

Another object of our invention is to provide an improved construction of battery terminal by which good electrical connection can be established between a cable and the battery without the application of a welding flame or solder which is objectionable when working in the confinement of the usual installation of a storage battery in an automobile.

Another object of our invention is to provide a construction of storage battery terminal in which a pair of screw-threaded wedge members are provided for establishing a rigid mechanical and electrical connection with the terminal of a storage battery merely under the application of a wrench or hand tool and without the employment of solder.

Our invention will be more clearly understood from the specification hereinafter following by reference to the accompanying drawings wherein:

Figure 1 is a fragmentary plan view illustrating the application of the storage battery terminal of our invention to a storage battery; Fig. 2 is a side elevation of the storage battery terminal of our invention; Fig. 3 shows a side elevation of the storage battery terminal with a part of the terminal shown in cross-section on line 3—3 of Fig. 1; Fig. 4 is an end view of the storage battery terminal taken on line 4—4 of Fig. 2; and Fig. 5 is a perspective view of the separable screw-threaded wedges which are employed for establishing the rigid mechanical and electrical connection between the battery cable and the storage battery.

It has been customary to weld the end of a conductor into a lug formed on a storage battery terminal which is secured over the upwardly protruding terminal post of the battery. Under normal operating conditions the conductor becomes corroded in the lug of the battery terminal, and as a result a high resistance path is established between the battery and the conductor which is a source of serious loss in the available energy and very often prevents the proper charging of the storage battery in an automobile from the generator. The installation conditions of a storage battery in an automobile are such that in order to renew a battery terminal between the connecting cable and the battery a blow torch must be applied and the old cable drawn out of the lug. Thereafter it is usual to replace a terminal on the end of a conductor by a welding and soldering process. The available working space is often very small and there is a continuous danger of injuring the upholstery of the automobile under the action of the blow torch. Moreover, the process of replacement and renewal requires a substantial amount of time which is often at a premium when such replacements are required.

Our invention is directed to a construction of terminal which is extremely simple and practical in design and which may be quickly applied to the terminal post of the storage battery and rigid mechanical and electrical connection established between the conductor and the battery terminal without the employment of solder or the application of heat.

Referring to the drawings in detail, reference character 1 designates a storage battery having a terminal post 2 projecting therefrom about which the strap member 3 is arranged to be detachably secured. The strap member 3 has a pair of parallel portions 4 and 5 through which a bolt member 6 passes. Bolt member 6 is provided with a headed end 10 and nut 7 by which the strap member 3 may be clamped about the post 2. The strap member 3 is interiorly tapered at 3ª and 3ᵇ to permit a good electrical connection to be established between the inner wall of the strap member 3 and the outer surface of the terminal post 2. An annular connecting path is formed between the strap member 3 and the upwardly protruding post 2, which path has a value of minimum electrical resistance. A substantially cylindrical lug 8 is formed integral with the portion 5 of the terminal strap and this lug is provided with an interior tapering bore substantially in the shape of the frustum of a cone, screw-threaded as indicated at 9. We provide a pair of screw threaded wedge members 11 and 12 arranged to cooperate with the interior threads 9 in the lug 8. These wedge members 11 and 12 are provided with substantially semi-spherical longitudinally extending portions 11$^a$ and 12$^a$ each of which are flattened as represented at 11$^b$ and 12$^b$. The wedges 11 and 12 when aligned with each other have a longitudinally extending bore 14 formed therethrough. This bore 14 has its interior walls roughened and provided with ridges as represented at 14$^a$ by which the end 15 of the cable 16 can be gripped for establishing good electrical connection between the conductor and the terminal. The flattened portions 11$^b$ and 12$^b$ of the screw-threaded wedges 11 and 12 may be gripped by the aid of a wrench when the members are in a position to embrace the free end 15 of a cable and then the wedges as a whole rotated by the wrench to a position interiorly of the lug 8 in such manner as to subject the conductor to compression. A good electrical connection and rigid mechanical connection is thereby quickly established between the free end of the conductor and the storage battery terminal.

The parts of the storage battery terminal of our invention are extremely simple and therefore capable of quantity production at small cost. The process of this assembly occupies but a brief interval of time and the connection between the cable and the terminal is so rigid that the effects of corrosion are negligible. The continued rotation of the screw threaded wedges to a position within the lug is such as to introduce mechanical stresses which bring about the establishment of a good electrical connection.

We have described our invention in one of its preferred embodiments, but we desire that it be understood that modifications may be made and that no limitations upon our invention are intended other than are imposed by the scope of the appended claims.

What we claim as new and desire to secure by Letters Patent of the United States is as follows:

1. A battery terminal connector comprising a member having a battery post engaging portion and having an internally threaded socket tapered inwardly from one end thereof, a frusto-conical member tapered to conform with said socket and externally threaded in its tapered surface for engagement in said socket, said frusto-conical member including a pair of separate elements formed to clamp a cable conductor therebetween as the frusto-conical member is screwed into the socket and having a cable receiving bore of uniform diameter throughout its length, said elements being relatively so arranged that when screwed into said socket they exert a clamping action upon said conductor which is uniform throughout the entire longitudinal extent of the conductor portion received between said elements.

2. A battery terminal connector having a battery post engaging portion and a portion comprising an internally threaded socket tapered inwardly from one end thereof, a frusto-conical member tapered to conform with said socket and externally threaded for engagement in said socket, said member including a pair of separate elements formed to clamp a cable conductor therebetween as the member is screwed into the socket, said elements being complementally grooved to conjointly provide a cable receiving bore extending longitudinally through the length of said member and within which said conductor is adapted to be clamped, and a pair of tool engaging portions respectively formed upon the outer ends of said elements for facilitating the aforesaid clamping action.

In testimony whereof we affix our signatures.

VERNON B. DAWSON.
IVAN B. PENTON.